No. 742,255. PATENTED OCT. 27, 1903.
J. F. STEWARD.
BUNCHING ATTACHMENT FOR MOWERS.
APPLICATION FILED JAN. 2, 1903.
NO MODEL. 2 SHEETS—SHEET 1.
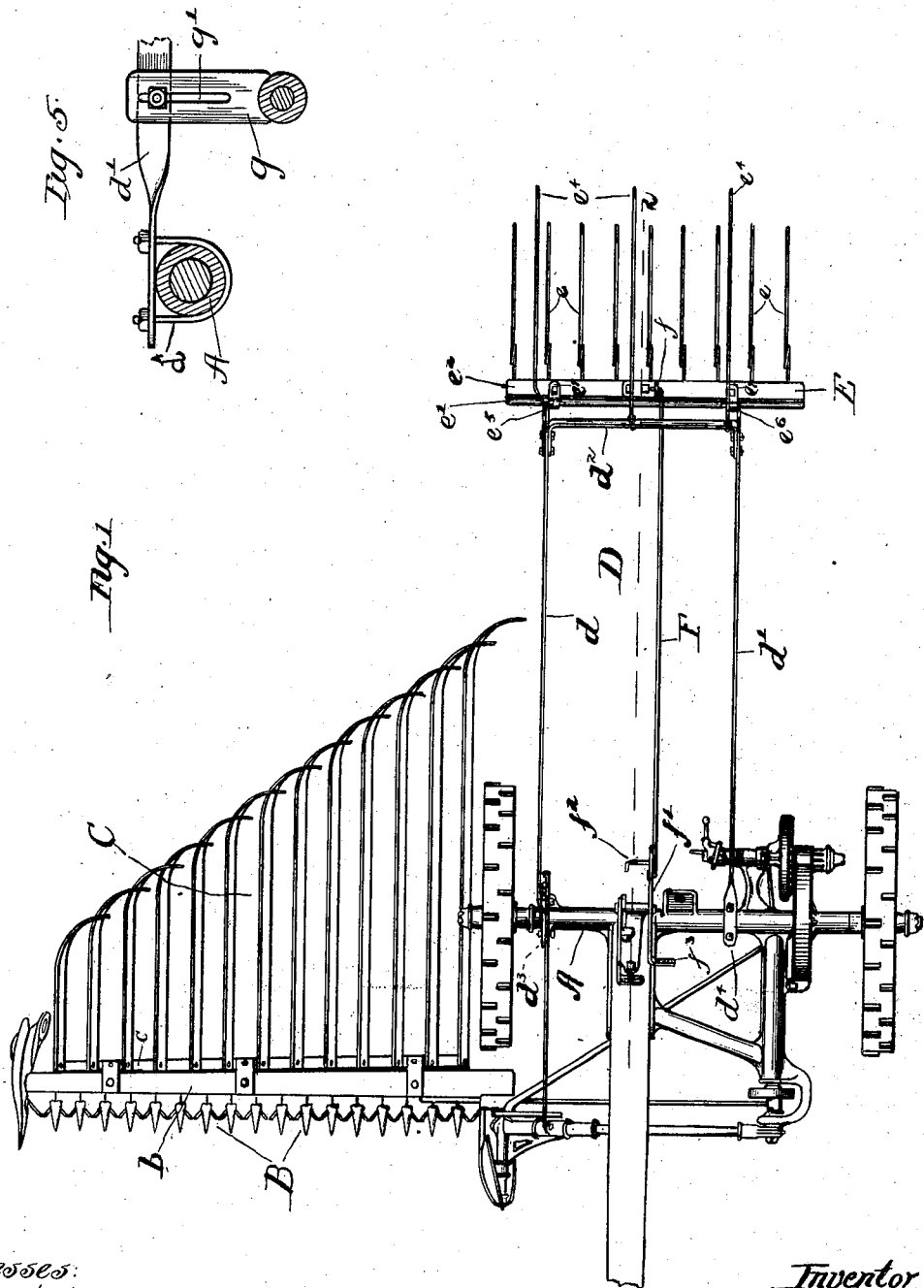
Witnesses:
Porris H. Alfreds.
J. C. Warnes.
Inventor
John F. Steward.

No. 742,255. PATENTED OCT. 27, 1903.
J. F. STEWARD.
BUNCHING ATTACHMENT FOR MOWERS.
APPLICATION FILED JAN. 2, 1903.
NO MODEL. 2 SHEETS—SHEET 2.
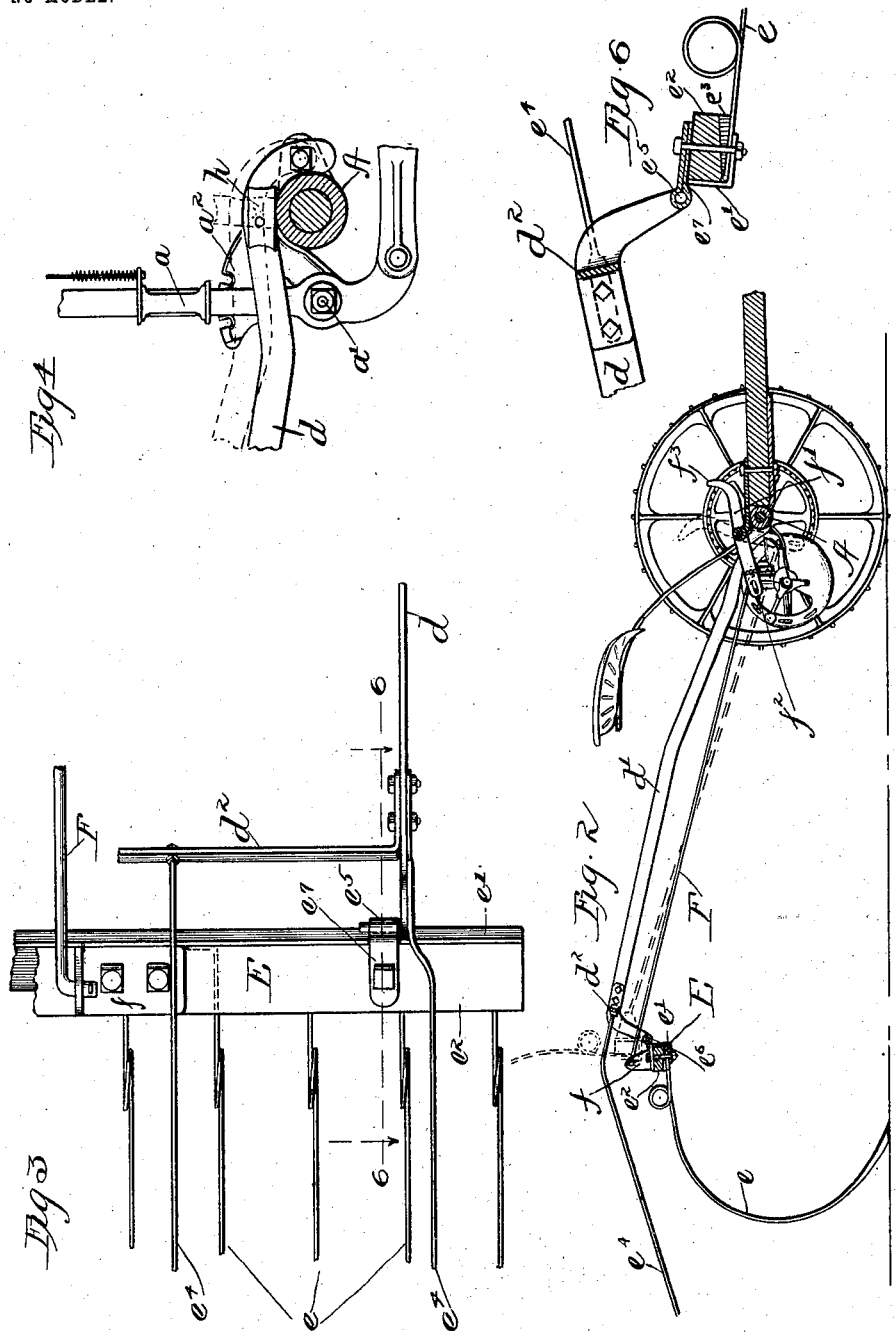
Witnesses:
Inventor
John F. Steward No. 742,255.

Patented October 27, 1903.

UNITED STATES PATENT OFFICE.

JOHN F. STEWARD, OF CHICAGO, ILLINOIS.

BUNCHING ATTACHMENT FOR MOWERS.

SPECIFICATION forming part of Letters Patent No. 742,255, dated October 27, 1903.

Application filed January 2, 1903. Serial No. 137,407. (No model.)

*To all whom it may concern:*

Be it known that I, JOHN F. STEWARD, of Chicago, in the county of Cook and State of Illinois, have invented a new and useful Improvement in Bunching Attachments for Mowers, the following being a complete specification of same.

My invention relates to those attachments used in connection with mowers for delivering grass, and particularly clover which is being cut for its seed, in bunches in the rear of the machine. The end in view is the production of a device readily attachable to a mower which will deliver the swath in a windrow behind the mower and collect this windrow into bunches far enough removed from the standing grass to avoid being trampled upon by the team and run over by the machine in the succeeding round.

In the drawings, Figure 1 represents a plan of a mower with my improvement attached thereto. Fig. 2 is a longitudinal sectional elevation on the line 2 2 of Fig. 1, showing the operating-levers of the rake attachment. Fig. 3 is a fragmentary plan of the rake attachment, showing pivotal bearing and stripper-arm support for same. Fig. 4 sets forth the pivotal connections of the grass-side bar of the rake-supporting frame to the axle of the main frame of the mower and means of adjustment for same. Fig. 5 shows the yoke-bolt connection of the stubble-side bar of the rake-supporting frame to the axle of the main frame of the mower and also the means of adjusting the height of same, while Fig. 6 is a sectional view on the line 6 6 of Fig. 3.

Referring to the drawings, A represents the main frame of a mower, B the cutting mechanism thereof, and $b$ the finger-bar of the cutting mechanism.

C is a windrowing attachment secured to the cutting apparatus of the mower. It consists of a series of gradually-lengthening fingers secured to the cross-bar $c$, which in turn is secured to the finger-bar $b$ of the cutting apparatus B. For more specific details of the construction of this attachment reference may be had to my application filed August 18, 1902, on a "Windrowing attachment for mowing-machines," Serial No. 12,002.

D is the rake-supporting frame, extending rearwardly from the main frame of the mower, to which it is pivotally secured, as shown in Figs. 4 and 5, and consists, essentially, of the two side bars $d$ and $d'$ and the cross-bar $d^2$ at the rear end thereof. The forward ends of these side bars $d$ and $d'$ are pivotally connected to the axle of the main frame at $d^3$ and $d^4$, respectively, the connection at $d^3$ being preferably to a forwardly-projecting lug on the said axle of the main frame and at $d^4$ by means of a yoke-bolt embracing the axle, as shown in Figs. 1, 4, and 5.

The pivotal bearing of the bar $d$ is preferably placed on the forward side of the main-frame axle, as shown, the end of the bar being bent, extending rearwardly and lying on the axle, which thus forms a support for the rake-frame. The yoke-bolt at $d^4$ and the connection at $d^3$, forming pivotal connections, will thus permit vertical movement of the rake-frame and rake thereon and prevent it descending below a certain predetermined height. The adjustment of the rear end of the rake-supporting frame D to this predetermined height is accomplished by the following means: On the forward end of the bar $d$, at a point substantially above the axle of the main frame, is the eccentric block $h$, (see Fig. 4,) pivotally secured to the said side bar $d$. The block $h$ is rectangular in shape, with its pivotal point nearer one side or end than the other, thus giving it an eccentric effect. The weight of the bar $d$ when raised is thus supported on the block $h$, which rests upon the axle-engaging portion of the main frame A. By turning this eccentric block on its pivotal bearing the rear end of the frame D will accordingly be raised or lowered by the raising and lowering of the bar $d$, as indicated by the dotted lines in Fig. 4. To correspondingly adjust the stubbleward bar $d'$ of the frame D, a depending arm $g$, (see Fig. 5,) provided with a longitudinal slot $g'$, is pivotally secured to the said bar in a position which will adapt it to rest upon the rearwardly-projecting gear-frame of the mower. By loosening the nut on the bolt which passes through the said slot $g'$ and normally secures the arm $g$ to the side bar $d'$ the said arm can be raised or lowered and a corresponding adjustment of this side of the frame thus secured.

E is the rake-head, pivotally supported on the bars $d$ and $d'$ of the frame D and in turn supporting the teeth $e$. The pivotal bearings $e^5$ and $e^6$ are preferably formed by pins riveted in the downturned ends of the bars $d$ and $d'$ and sleeved in lugs $e^7$, which are bolted to the rake-head E. The rake-head E consists, essentially, of the angle-iron $e'$ and the wood cleat $e^2$, (see Fig. 6,) riveted thereto, the cleat $e^2$ being provided with suitable mortises $e^3$ for the reception of the said teeth.

$e^4$ represents stripper-teeth secured to the rear cross-bar $d^2$ of the rake-frame D.

The rake is operated by a rod F, the end of which is received by an upreaching lug as one piece with the rake-head E. This rod F extends forwardly and connects with the foot-lever $f'$, which is suitably mounted on the main frame A of the mower. Pressure applied to the foot-piece $f^2$ of the lever $f'$ operates to rock the rake-head E about its pivotal bearings $e^5$ and $e^6$, thus raising the rake-teeth from the ground and discharging the bunch of accumulated grass. The rake-head will return to normal working position by gravity, but may be returned and held positively by pressure on the foot-piece $f^3$ of the foot-lever $f'$. The positions of the rake-head, the rod F, and the operating-lever when raised are shown in dotted lines in Fig. 2.

$a$ is the usual tilting lever, pivoting at $a'$ on the segment $a^2$, which is as one piece with the mower-frame A, the lower arm of the said lever connecting with the cutting apparatus in the usual way. A detailed description need not be given of this lever and other parts common to an ordinary mower, as they form no part of this invention.

Owing to the pivotal connection of the rake-frame to the mower-frame and the eccentric block and depending arm, which act as adjustable limit-stops to limit the downward movement of the rake-frame relative to the mower-frame the said mower will support the rake when said rake is being dumped, and in operation the pivotal connection between said rake-frame and mower-frame will permit the rake to automatically adjust itself to the undulations of the ground within a prescribed range.

What I claim as my invention, and desire to secure by Letters Patent, is—

1. The combination with a mower having a side-delivery windrowing device, a rake pivotally attached to the rear of the said mower and in a position adapted to bunch the windrow delivered from the said windrowing device, substantially as described.

2. In combination with a mower having a side-delivery windrowing device consisting of a series of parallel slats gradually increasing in length stubbleward, and upwardly inclined at the rear ends thereof, a rake attachment comprising a frame, a rake pivotally mounted thereon and means for operating said rake, substantially as described.

3. In combination with a mower having a side-delivery windrowing device, a rake attachment pivotally secured to said mower, and a rake pivotally mounted on the rear end thereof, a lever for operating said rake and means for adjusting the amount of the drop of said frame relative to said mower, substantially as described.

4. In combination with a mower having a side-delivery windrowing device, a rake attachment pivotally secured to said mower and adapted to automatically adjust itself to the undulations of the surface over which it passes, and comprising a frame, a rake pivotally mounted thereon and means for operating said rake, substantially as described.

JOHN F. STEWARD.

In presence of—
J. C. WARNES,
T. H. ALFREDS.